April 30, 1929.  D. L. BENTON  1,711,080
BUMPER STRUCTURE
Filed Dec. 28, 1927  2 Sheets-Sheet 1
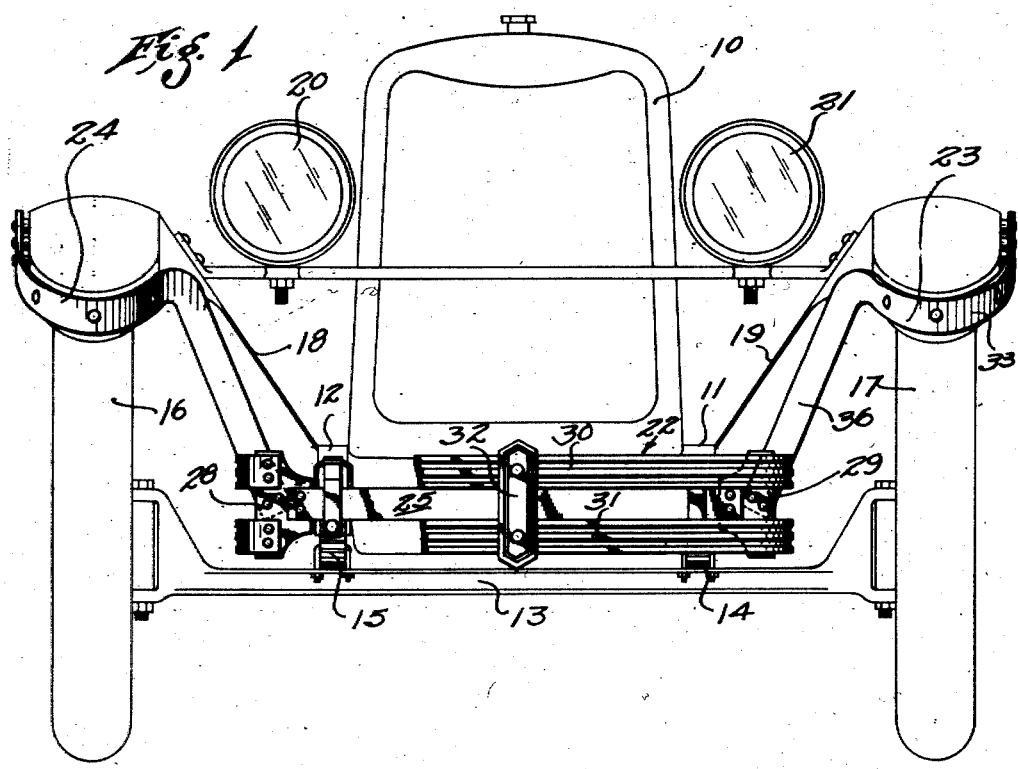
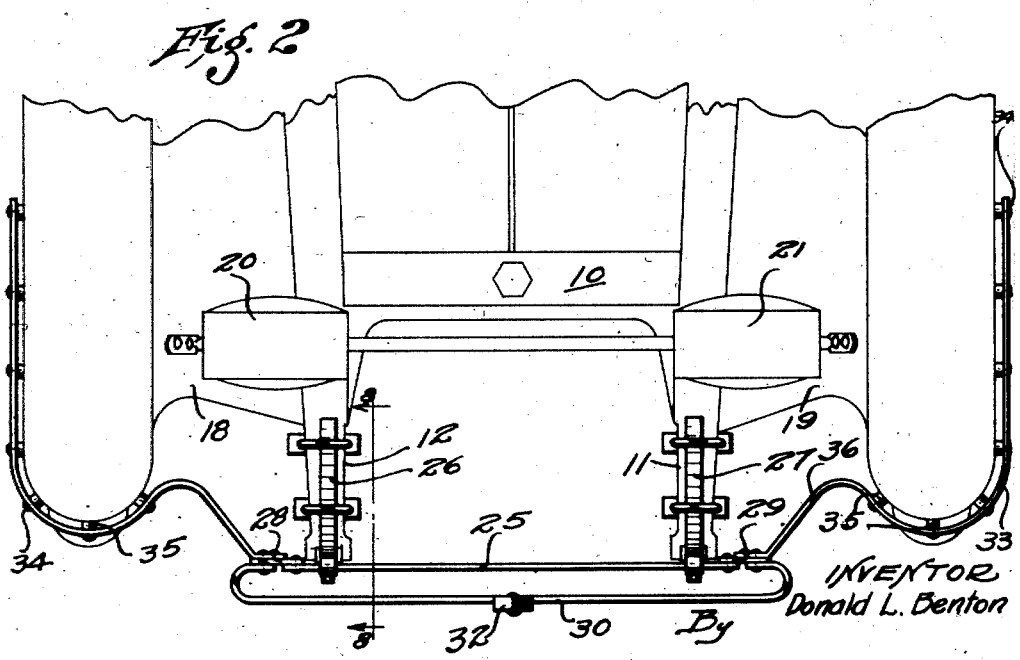

April 30, 1929. D. L. BENTON 1,711,080
BUMPER STRUCTURE
Filed Dec. 28, 1927 2 Sheets-Sheet 2
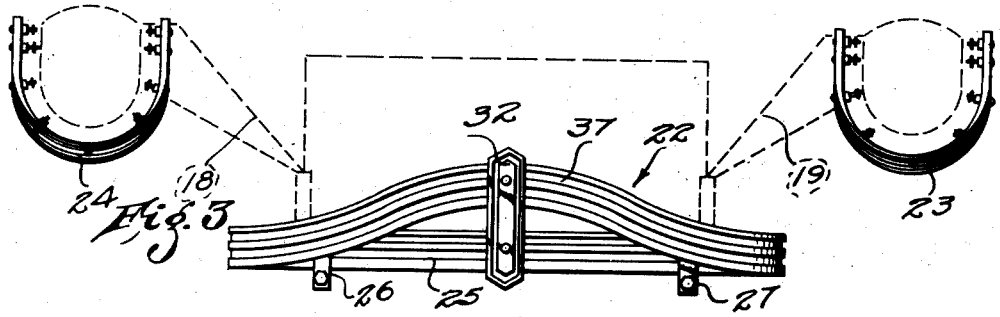
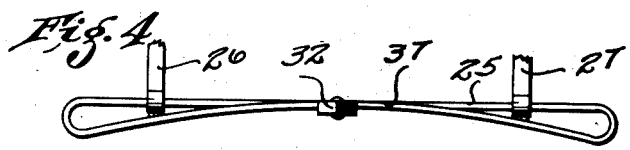
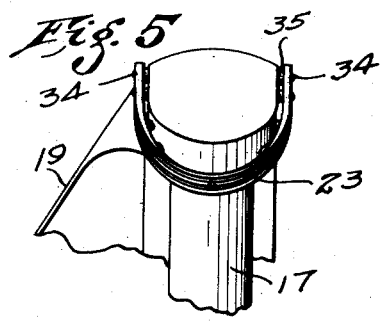
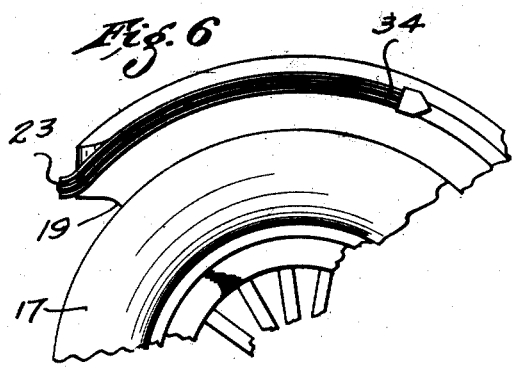
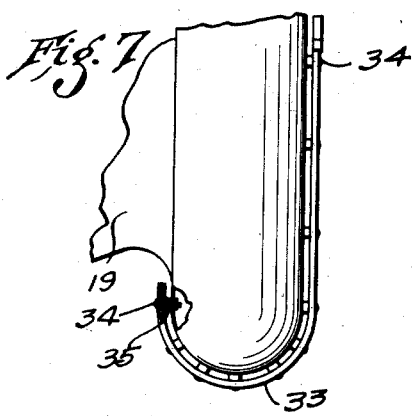
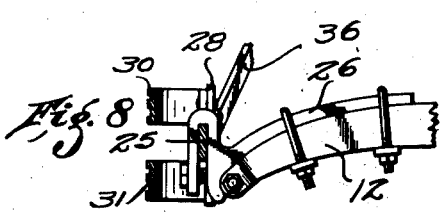
INVENTOR
Donald L. Benton
By Townsend, Loftus & Abbett
ATTORNEYS Patented Apr. 30, 1929.

1,711,080

UNITED STATES PATENT OFFICE.

DONALD L. BENTON, OF LOS ANGELES, CALIFORNIA.

BUMPER STRUCTURE.

Application filed December 28, 1927. Serial No. 243,006.

This invention relates to automobiles and particularly pertains to protection for the ends thereof against collision.

At the present time it has become a matter of common practice to attach automobile bumpers at the front and rear of automobiles to protect the automobile from injury in collision, and from injury incident to traffic congestion at which times cars are in close proximity to each other. The usual method of this protection is to secure a resilient bumper bar transversely of the ends of the automobile, and in a position to overhang the fenders. The overhanging ends of such bumpers project in front of the front wheels and in the rear of the rear wheels of a vehicle, and materially increase the area required for turning the vehicle in traffic.

It is the principal object of the present invention to provide a protecting structure adapted to be applied to an automobile, and which will make a maximum clearance in traffic, and at the same time will afford greater protection for the fenders and ends of the automobile than is now possible.

The present invention contemplates the provision of a relatively short horizontally disposed bumper, secured across the ends of the vehicle frame and in conjunction with which fender shields are provided to extend across the end and around the marginal edge of the vehicle fender in a manner to protect it from collision, and to prevent it from being distorted.

The invention is illustrated by way of example in the accompanying drawings, in which:

Fig. 1 is a view in front elevation showing one form of the present invention, with a portion of the bumper broken away to illustrate the manner in which it is mounted.

Fig. 2 is a fragmentary view in plan showing the construction of the device disclosed in Fig. 1.

Fig. 3 is a view in front elevation showing another form of the present invention.

Fig 4 is a view in plan showing the bumper disclosed in Fig. 3.

Fig. 5 is a fragmentary view showing a fender shield as applied to the contour of the vehicle fender.

Fig. 6 is a fragmentary view in side elevation showing the fender shield.

Fig. 7 is a view in plan showing the fender shield.

Fig. 8 is a fragmentary view in vertical section and elevation showing one manner of mounting the bumper upon the frame.

Referring more particularly to the drawings 10 indicates the radiator of an automobile which is supported upon the main frame members 11 and 12. A front vehicle axle 13 is secured beneath the frame members and carries springs 14 and 15. The wheels of the vehicle are indicated at 16 and 17. It is common to mount wheel fenders 18 and 19 upon the frame and to cause them to overhang the wheels. It is also common practice to suitably support the headlights 20 and 21 at the forward end of the vehicle, and it is the object of the present invention to provide means for collectively protecting the radiator, headlights and fenders from impact, and to also interpose impact absorbing means between the ends of the frame and an object in collision therewith to prevent distortion of the frame. This is accomplished in the present instance by a bumper structure 22 and fender shields 23 and 24. The bumper structure is here shown as being of the resilient bar type, as shown in Hoover Patents 1,191,306 and 1,221,800, issued to Thos. A. Hoover, January 9, 1917, and April 3, 1917, respectively.

This bumper comprises a back bar 25 extending transversely of the ends of the automobile, and being engaged by brackets 26 and 27, which are secured to the frame members 11 and 12, and which support the back bar 25 of the bumper in a position across the ends of the frame member as clearly shown in Fig. 8 of the drawings. The back bar carries T-shaped bolting plates 28 and 29 at its opposite ends. These members receive the recurved ends of front impact bars 30 and 31.

As shown in Fig. 1 of the drawings, the impact bars are disposed in parallel spaced relation to each other, and are superposed in the same vertical plane. A suitable fitting 32 secures the impact bars in spaced vertical relation to each other.

It, of course, will be understood that various types of bumper structures may be used. The characteristic feature of the present structure, however, is that the ends of the bumper overhang the frame but a very short distance and do not project outwardly to overhang and protect the fenders 18 and 19 of the vehicle. The bumper structure therefore, acts as a fender or buffer for the vehicle frame and tends to absorb shock which would otherwise be imparted thereto by collision, and particularly in traffic congestion. The advantage of the short length bumper is that its overhanging ends will not hook other cars when turning or maneuvering in traffic and will facilitate handling the car on crowded thorofares.

In order to insure protection for the fenders of the car without requiring great turning clearance, fender shields 23 and 24 are provided. These shields each consist of a bar 33 which follows the contour of the outer edge of a fender and is spaced a distance therefrom, as clearly indicated in Fig. 2 of the drawings. This bar is preferably made of spring steel and extends around the end of the fender, as well as along the edge thereof, for a desired distance. The bar is secured in position by bolts or rivets 34, which pass through resilient spacers 35. These spacers are interposed between the bar and the vertical edge of the fender and act to space the bar therefrom as well as to resiliently support the bar while absorbing impact shock delivered thereto.

It has also been found that the resilient character of the spacers makes it possible to readily adapt the bar to fenders of different contour.

In the form of the invention shown in Figs. 1 and 2 of the drawings, the bars 33 are provided with mounting extensions 36, which are secured to the T-shaped bolting plates 29 at the ends of the bumpers, and by which the inner ends of the bars 33 are suitably supported.

In the form of the invention shown in Fig. 3 of the drawings, the shields are not directly connected with the bumper structure, but cooperate in conjunction therewith to provide protection for the shields and the front of the vehicle, as well as the lamps and the radiator.

In the form of the bumpers shown in Figs. 3 and 4 of the drawings, it will be seen that the back bar 25 has been bent to form recurved loops at its opposite ends and continues in an upwardly curved impact bar 37.

The fender shields as shown in Figs. 5, 6 and 7 of the drawings, and identical with those shown in Figs. 1 and 2, with the exception that the connecting member is eliminated. By the use of these fender shields, even though unattached to the bumper bar, it has been found that they materially stiffen the vehicle fenders so that they will withstand the shock without crumpling and that they also prevent concentration of a blow at a point in the fender which would cause it to be crushed or dented, and it has also been found that the fender shields add to the sightly appearance of the vehicle.

It will thus be seen that the structure here disclosed provides effective means for protecting all of the vital parts of an automobile, either at the front or rear end thereof, and that at the same time it makes it possible for the vehicle to be more readily maneuvered in traffic and on the highway than is now possible with bumpers of present design.

While I have shown the preferred form of my invention, as now known to me, it will be understood that various changes may be made in the combination, construction and arrangement of parts without departing from the spirit of the invention as claimed.

Having thus described my invention, what I claim and desire to secure by Letters Patent is—

1. In combination with the frame and fenders of an automobile, a bumper structure extending transversely of the frame and supported thereby, said structure being of a length slightly greater than the width of the frame less than the distance between the wheel fenders of the vehicle, and fender shields carried by said bumper structure and extending upwardly and around the marginal edge of the vehicle fenders.

2. In combination with the frame and fenders of an automobile, a bumper structure extending transversely of the frame and supported thereby, said structure being of a length slightly greater than the width of the frame less than the distance between the wheel fenders of the vehicle, fender shields carried by said bumper structure and extending upwardly and around the marginal edge of the vehicle fenders, and means resiliently mounting said fender shields upon the fenders.

3. In combination with the main frame of an automobile and its wheel fenders, protecting means therefor comprising a resilient looped end bumper structure secured across the ends of said frame, said structure being of a length slightly greater than the over-all width of the frame, and a pair of fender shields carried by the fenders of the vehicle and conforming to the contour thereof, said shields extending upwardly and outwardly from the looped ends of the bumper.

4. In combination with the main frame of an automobile and its wheel fenders, protecting means therefor comprising a resilient bumper structure secured across the ends of said frame, said structure being of a length slightly greater than the over-all width of the frame and less than the distance between the wheel fenders of the vehicle, and a pair of fender shields carried by the fenders of the vehicle and conforming to the contour thereof, said shields extending outwardly from a point substantially in alignment with the ends of the bumper, and means for resiliently mounting said shields upon the fender and in spaced relation to the marginal edge thereof.

5. A traffic bumper comprising, in combination with a vehicle frame, a resilient bumper structure having a resilient impact bar extending transversely of the end of the automobile and slightly overhanging the sides of the frame and being of an over-all length less than the distance between the wheel fenders of the vehicle, and means for mounting said impact bar upon the frame.

6. A traffic bumper comprising, in combination with a vehicle frame, a bumper structure of a length substantially equal to the over-all width of the frame, and resilient means for securing said structure to the frame, and a pair of fender shields secured to the bumper adjacent its outer ends and adapted to extend upwardly to the fenders and to thereafter conform to the marginal contour thereof.

7. A traffic bumper comprising, in combination with a vehicle frame, a bumper structure of a length substantially equal to the over-all width of the frame, and resilient means for securing said structure to the frame, a pair of fender shields secured to the bumper adjacent its outer ends and adapted to extend upwardly to the fenders and to thereafter conform to the marginal contour of the end thereof, and means for resiliently securing said fender shields to the marginal edge of the fender.

8. A bumper structure adapted to be positioned across the front of an automobile, comprising an impact bar bent upon itself at its opposite ends to form looped ends, the looped end portions of said bar overhanging the side frame members of the vehicle and being positioned between said side frame members and the inner line of the wheel fenders, a back bar secured to the inwardly extending free ends of the impact bar, means for mounting said back bar upon the frame end, and fender guards one of which is secured to an end of the back bar and extends upwardly to conform to the end and the outer side of the wheel fender, and resilient facing means interposed at intervals between the fender guard and the marginal edge of the wheel fender for securing said guard section in position with relation to said fender.

DONALD L. BENTON.